US007426370B2

(12) United States Patent
Nakao et al.

(10) Patent No.: US 7,426,370 B2
(45) Date of Patent: Sep. 16, 2008

(54) RADIO COMMUNICATION QUALITY MEASURING APPARATUS, RADIO COMMUNICATION QUALITY MEASURING METHOD AND RADIO BASE STATION

(75) Inventors: Seigo Nakao, Gifu (JP); Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 962 days.

(21) Appl. No.: 10/221,683

(22) PCT Filed: Mar. 15, 2001

(86) PCT No.: PCT/JP01/02052

§ 371 (c)(1),
(2), (4) Date: Dec. 26, 2002

(87) PCT Pub. No.: WO01/69816

PCT Pub. Date: Sep. 20, 2001

(65) Prior Publication Data

US 2005/0186912 A1 Aug. 25, 2005

(30) Foreign Application Priority Data

Mar. 16, 2000 (JP) ............................ 2000-074886

(51) Int. Cl.
*H04B 17/00* (2006.01)

(52) U.S. Cl. ..................................... 455/67.16; 455/69

(58) Field of Classification Search .................. 455/69, 455/522, 67.16, 67.6, 10, 504, 506; 370/252, 370/320, 321; 375/226, 330, 331, 332, 347, 375/371

See application file for complete search history.

(56) References Cited

U.S. PATENT DOCUMENTS 5,991,273 A * 11/1999 Abu-Dayya ................ 370/252
6,678,309 B1 * 1/2004 Kitahara ..................... 375/144

FOREIGN PATENT DOCUMENTS

| | | |
|---|---|---|
| EP | 1014599 | 6/1999 |
| JP | 7-87011 | 3/1995 |
| JP | 11-313364 | 11/1999 |
| JP | 2000-22611 | 1/2000 |

* cited by examiner

*Primary Examiner*—Edward Urban
*Assistant Examiner*—Tu X Nguyen

(57) ABSTRACT

The present invention is aimed to provide a radio base station that communicates with a plurality of mobile stations by a method, such as the space division multiplex, of simultaneously multiplexing into the same frequency, and exercise a control using an index that is different from the SIR and can be used in a control exercised to properly separate signals sent from mobile stations from the same frequency. The reception response vector predicting unit (524), provided in the radio base station of the present invention, obtains a reception response vector that indicates a propagation path of a signal from a mobile station to the radio base station, for each of the plurality of mobile stations. The reception DD ratio calculator (51) obtains two reception response vectors for two mobile stations from the reception response vector predicting unit, calculates a reception DD ratio of (i) a square of a reception response vector of a mobile station to (ii) a square of a reception response vector of the other mobile station, and sends the calculated reception DD ratio to the control unit (80). The control unit (80) judges whether to exercise the transmission power control or the like, based on the reception DD ratio. If the reception DD ratio is not belong to a certain value range, the transmission power control or the like is exercised.

16 Claims, 6 Drawing Sheets

RADIO COMMUNICATION QUALITY MEASURING APPARATUS, RADIO COMMUNICATION QUALITY MEASURING METHOD AND RADIO BASE STATION

TECHNICAL FIELD

The present invention relates to a radio base station that performs radio communications with radio phone apparatuses (hereinafter referred to as mobile stations) such as PHS (Personal Handy Phone System) mobile terminals and mobile phones. More specifically, the present invention relates to a technique for measuring the quality of communications performed by a radio base station with a plurality of mobile stations.

BACKGROUND ART

Conventionally, radio base stations have used multiplexing techniques so as to assign channels to mobile stations and communicate with the mobile stations. Among such multiplexing techniques, space division multiplex and CDMA (Code Division Multiple Access) are known to effectively use frequency resources.

In CDMA, a transmission power of each mobile station is adjusted by a transmission power control.

In CDMA, all mobile stations use carrier waves having the same frequency. In such circumstances, if all mobile stations transmitted signals using the same transmission power regardless of the distances from a base station, the base station could not separate signals from remote mobile stations due to the strength of the signals from near mobile stations. This problem is called “near-far problem”. The transmission power control is indispensable in preventing the near-far problem.

In the transmission power control, usually, the radio base station diffuses the signals from each mobile station to obtain SIR (Signal to Interference Ratio), namely a ratio of received signal power to interference power, of each mobile station, and controls each mobile station so that the SIR of the mobile station are kept to be a constant value. Refer to, for example, Japanese Laid-Open Patent No. 9-284205 for the transmission power control.

In CDMA, the SIR indicating the communication quality is used as an index during control exercised to properly separate the signals sent from the mobile stations.

DISCLOSURE OF THE INVENTION

It is therefore the object of the present invention to provide radio communication quality measuring apparatus and method for use in a radio base station that communicates with a plurality of mobile stations by a method, such as the space division multiplex, of simultaneously multiplexing into the same frequency, the apparatus and method calculating an index that is different from the SIR and can be used in a control exercised to properly separate signals sent from mobile stations from the same frequency, and to provide the radio base station that exercise a control using the calculated index.

The object can be achieved by a radio communication quality measuring apparatus for use in a radio base station that communicates with a plurality of mobile stations by a method of simultaneously multiplexing into the same frequency, characterized by measuring a reception response vector that indicates a propagation path of a signal from a mobile station to the radio base station, for each of the plurality of mobile stations, calculating a reception power ratio from reception response vectors in terms of two mobile stations out of the plurality of mobile stations, and outputting the reception power ratio as an index of communication quality.

With the above-described construction, the radio base station can properly judge, for example, whether to exercise the transmission power control, using as a criterion the reception power ratio output from the radio communication quality measuring apparatus.

It should be noted here that the reception response vector is obtained by a method which will be described later with reference to Formulas 3-8, so that effects of noise components have been eliminated from the reception response vector. As a result, the reception power ratio calculated from the size of the two reception response vectors is not affected by the noise components. The calculated reception power ratio is therefore superior as a criterion for judging, for example, whether to exercise the transmission power control.

The object can also be achieved by a radio base station that communicates with a plurality of mobile stations by space division multiplex, comprising: a plurality of antennas; a reception response vector calculating means for calculating a reception response vector that indicates a propagation path of a signal from a mobile station to the plurality of antennas, for each of the plurality of mobile stations; a reception power ratio calculating means for calculating a reception power ratio of two mobile stations, the reception power ratio being a ratio of (i) a square of a reception response vector, calculated by the reception response vector calculating means, of one of the two mobile stations to (ii) a square of a reception response vector, calculated by the reception response vector calculating means, of the other of the two mobile stations; and a control means for, if the calculated reception power ratio is outside a predetermined value range, exercising a control to change a state of communication that is performed with at least one of the plurality of mobile stations.

With the above-described construction, when a difference between reception power levels from mobile stations increases, the transmission power control or the like can be exercised to reduce the difference. This enables communication data to be properly separated from signals, for each mobile station.

In the above radio base station, the radio base station may perform a radio communication by a time division multiplex in addition to the space division multiplex, the reception response vector calculating means calculates the reception response vector for each reception time slot for the time division multiplex, and the reception power ratio calculating means calculates the reception power ratio for each reception time slot for the time division multiplex.

With the above-described construction, it is possible to exercise the transmission power control or the like responding quickly to the change of the communication state.

The object can also be achieved by a radio base station that communicates with a plurality of mobile stations by space division multiplex, comprising: a plurality of antennas; a reception response vector calculating means for calculating a reception response vector that indicates a propagation path of a signal from a mobile station to the plurality of antennas, for each of the plurality of mobile stations; a reception power ratio calculating means for calculating a reception power ratio of two mobile stations, the reception power ratio being a ratio of (i) a square of a reception response vector, calculated by the reception response vector calculating means, of one of the two mobile stations to (ii) a square of a reception response vector, calculated by the reception response vector calculating means, of the other of the two mobile stations; a reception power level measuring means for measuring a reception power level for each signal received via the plurality of antennas; a mobile-station-specific reception power level calculating means for calculating a reception power level for each of the plurality of mobile stations according to the calculated reception power ratio and the measured reception power level; and a control judging means for judging whether to exercise a control to change a state of communication performed with each of the plurality of mobile stations, according to the calculated reception power level for each mobile station.

With the above-described construction, it is possible, in response to RSSI of each mobile station, to control each mobile station to change the transmission power so that the RSSI is in a certain value range, or to prevent a mobile station from exercising the transmission power control in accordance with the reception DD ratio if the RSSI of the mobile station is in the certain value range.

The object can also be achieved by a radio communication quality measuring method that is used in a radio base station that communicates with a plurality of mobile stations by space division multiplex, and is used to calculate a reception power ratio that is an index used as a criterion in judging whether to exercise a control to change a state of communication performed with each of the plurality of mobile stations, the radio communication quality measuring method comprising: a reception response vector calculating step for calculating a reception response vector that indicates a propagation path of a signal from a mobile station to the plurality of antennas, for each of the plurality of mobile stations; and a reception power ratio calculating step for calculating a reception power ratio of two mobile stations, the reception power ratio being a ratio of (i) a square of a reception response vector, calculated in the reception response vector calculating step, of one of the two mobile stations to (ii) a square of a reception response vector, calculated in the reception response vector calculating step, of the other of the two mobile stations.

With the above-described construction, it is possible for the radio base station to properly judge whether to exercise the transmission power control or the like, in accordance with the reception DD ratio being a reception power ratio that is substantially not affected by noise components.

BEST MODE FOR CARRYING OUT THE INVENTION

Embodiment 1

A radio base station as Embodiment 1 of the present invention will be described with reference to the attached drawings.

Construction

Figure 1:
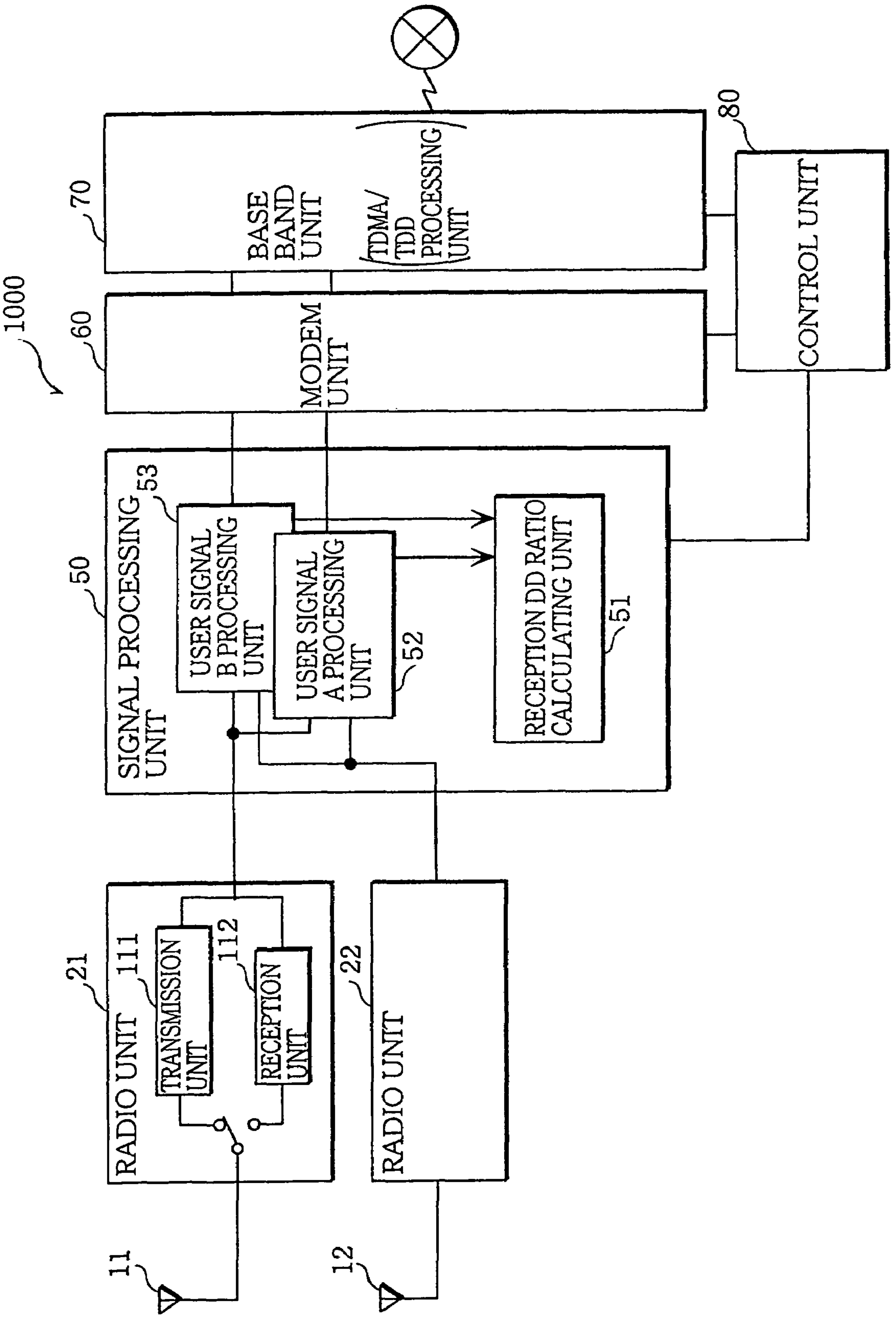
FIG. 1 is a block diagram showing the construction of the radio base station 1000 in Embodiment 1.

FIG. 1 is a block diagram showing the construction of the radio base station 1000 in Embodiment 1.

The radio base station 1000 is a radio base station that uses a TDMA/TDD (Time Division Multiple Access/Time Division Duplex) adopted in the PHS standard and the space division multiplex to perform radio communications with PHS mobile terminals (mobile stations), where for the space division multiplex, two signals at the maximum are assigned to the same frequency. The radio base station 1000 includes antennas 11 and 12, radio units 21 and 22, a signal processing unit 50, a modem unit 60, a base band unit 70, and a control unit 80.

The radio base station 1000 multiplexes four channels into one TDMA frame in accordance with the PHS standard, and processes simultaneously two telephone lines at the maximum to be space-multiplexed for each channel. One TDMA frame has a cycle of 5 mS (milliseconds) and has four transmission time slots and four reception time slots that are obtained by dividing the cycle equally. One pair of a transmission time slot and a reception time slot constitutes one time-division channel.

In the space division multiplex, the radio base station forms different directional patterns for a plurality of mobile stations existing in different directions, so as to perform communications with the plurality of mobile stations at the same time using the same frequency. For example, adaptive array apparatuses form different directional patterns. Every adaptive array apparatus has a plurality of fixed antennas. The plurality of antennas, as a whole, dynamically form directional patterns for transmission and reception by dynamically adjusting the amplitude and phase of transmission/reception signals for each antenna. For the adaptive array apparatus, please refer to The Journal of the Institute of Electronics, Information and Communication Engineers in Japan, Vol. J75-B-2, No. 11, "Papers on adaptive signal processes in space domain and their applications". Adaptive array apparatuses increase the transmission strength and the reception sensitivity in a desired direction for a mobile station, and at the same time, decrease the transmission strength and the reception sensitivity in another direction for another mobile station.

The base band unit 70 transfers a plurality of signals (base band signals of audio or data) between the signal processing unit 50 and a plurality of telephone lines connected via a telephone switching network.

The modem unit 60 modulates/demodulates digitized base band signals, which are transferred between the signal processing unit 50 and the base band unit 70, using π/4 shift QPSK (Quadrature Phase Shift Keying). The modulation and demodulation are performed simultaneously for two base band signals at the maximum for one time-division channel.

The signal processing unit 50 exercises control concerning formation of the directional pattern under the control of the control unit 80. That is to say, the signal processing unit 50 separates different signals from a space-division-multiplexed signal received from the radio units 21 and 22 and outputs the separated signals to the modem unit 60. The signal processing unit 50 also assigns weights for space division multiplex to signals received from the modem unit 60 and outputs the weighted signals to the radio units 21 and 22 so that the signals can be transmitted to desired mobile stations. More specifically, the signal processing unit 50 is achieved by a programmable DSP (Digital Signal Processor). Note that the formation of the directional pattern in the space division multiplex for transmission/reception is only performed in communications using communication channels. In the communications using the other control channels, basically the space division multiplex is not used, and the same control is exercised as conventional PHS radio base stations.

The signal processing unit 50 calculates "reception DD (Desired to Desired) ratio", which has not been used conventionally and is used as an index to separate signals from mobile stations properly, and sends the calculated reception DD ratio to the control unit 80. The reception DD ratio is a ratio of "desired wave power" of one mobile station to "desired wave power" of another mobile station in the space division multiplex, the "desired wave power" being a power of an electric wave transmitted from a mobile station.

The radio unit 21 is composed of a transmission unit 111 having a high-power amplifier, and a reception unit 112 having a low-noise amplifier. The transmission unit 111 converts a signal input from the signal processing unit 50 from a low frequency to a high frequency, amplifies the signal to a transmission output level, and outputs the signal to the antenna 11. The transmission unit 111 can adjust a transmission output by controlling the gain of the high-power amplifier. The reception unit 112 converts a signal input from the antenna 11 from a high frequency to a low frequency, amplifies the signal, and outputs the signal to the signal processing unit 50. The radio unit 22 has the same construction as the radio unit 21.

The control unit 80 includes a CPU (Central Processing Unit) and a memory as hardware, and the CPU executes a program stored in the memory to control each component of the radio base station 1000. The control unit 80 receives the reception DD ratio from the signal processing unit 50, and controls the transmission power or the like in accordance with the reception DD ratio.

Figure 2:
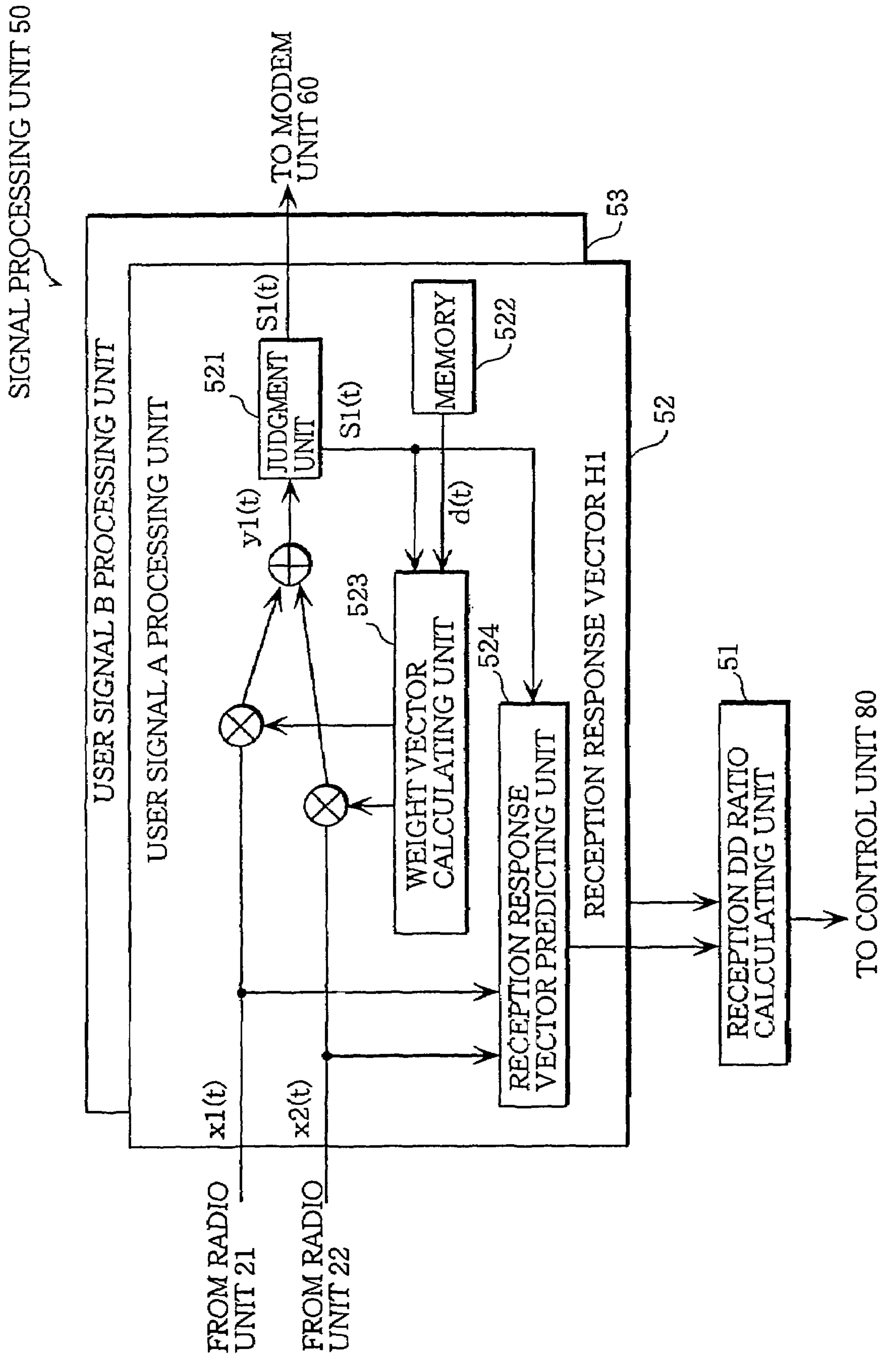
FIG. 2 is a block diagram showing the construction of the signal processing unit 50.

FIG. 2 is a block diagram-showing the construction of the signal processing unit 50.

The signal processing unit 50 is composed of a reception DD ratio calculating unit 51, a user signal A processing unit 52, and a user signal B processing unit 53. FIG. 2 shows a functional diagram in the case where the construction functions only when a signal is received from a mobile station. The following description will be centered on the signal reception from mobile stations, not the signal transmission to mobile stations.

The user signal A processing unit 52 and the user signal B processing unit 53 have the same construction, and each of the units extracts a signal from a certain user, namely a certain mobile station and sends the extracted signal to the modem unit 60, and sends a reception response vector to the reception DD ratio calculating unit 51, where the reception response vector is a coefficient that indicates a signal propagation path from the certain mobile station to the radio base station.

The user signal A processing unit 52 includes a judgment unit 521, a memory 522, a weight vector calculating unit 523, and a reception response vector predicting unit 524.

The judgment unit 521 receives a temporary reception signal yl (t) that is a sum of values obtained by multiplying a weight vector calculated by the weight vector calculating unit 523 to each of the reception signals x1(t) and x2(t) that are received from the radio units 21 and 22, respectively. The judgment unit 521 then obtains an extracted signal S1(t) from the received temporary reception signal y1(t) by correcting the phase value of the received temporary reception signal y1(t) to be an integral multiple of $\pi/4$, and sends the extracted signal S1(t) to the modem unit 60. The judgment unit 521 also sends the extracted signal S1(t) to the weight vector calculating unit 523 and the reception response vector predicting unit 524. Note that the extracted signal S1(t) is also interpreted as a signal that has been extracted as a signal sent from user A corresponding to the certain mobile station.

The memory 522 stores reference signals such as start symbols, preambles, and unique words that are fixedly defined by the PHS standard.

The weight vector calculating unit 523 refers to a reference signal stored in the memory 522, and calculates a weight vector that is to be multiplied to each of reception signals sent from the radio units 21 and 22 next time, namely at time (t+1), using the signal S1(t) sent from the judgment unit 521. That is to say, the signal S1(t) obtained using the last-calculated weight vector becomes the base for calculating a weight vector next time, namely at time (t+1). How to calculate the weight vector will be explained later.

The reception response vector predicting unit 524 obtains a reception response vector H1 from (a) reception signals received from the radio units and (b) signal S1(t) received from the judgment unit 521, and sends the obtained reception response vector H1 to the reception DD ratio calculating unit 51. The reception response vector H1 indicates a signal propagation path from the certain mobile station (user A) to the radio base station.

Operation

The operation of the radio base station 1000 with the above-stated construction will be described.

First, the calculation of the extracted signal S1(t) and weight vector will be described.

$$Y1(t)=w1(t)\times x1(t)+w2(t)\times x2(t) \qquad \text{Formula 1}$$

As shown in Formula 1, the user signal A processing unit 52 obtains the temporary reception signal y1(t) that is a sum of values obtained by multiplying a weight vector calculated by the weight vector calculating unit 523 to each of the reception signals x1(t) and x2(t) that are received from the radio units 21 and 22, respectively. The user signal A processing unit 52 then converts the temporary reception signal y1(t) to the extracted signal S1(t) by allowing the judgment unit 521 to correct the phase value of the received temporary reception signal y1(t).

Note that in Formula 1, "t" indicates a time required for a signal to reach, and is equal to an elapse time in a time slot, the elapse time being represented in units of times taken to receive "symbols" defined in the PHS standard.

Each of the reception signals x1, x2, weight vectors w1, w2 or the like is a signal sequence, where "t" is 1, 2, . . . Each of the reception signals x1, x2, weight vectors w1, w2, temporary reception signal y1, extracted signal S1 has the amplitude and phase, and therefore can be expressed by a complex number.

It is supposed in the present example that the weight vector calculating unit 523 calculates the weight vector using the MMSE (Minimum Mean Square Error) method as follows.

The weight vector has an appropriate initial value, and is updated to w(t+1) every unit time by changing w(t) in a predetermined range so that an error between the reference signal d(t) and the extracted signal S1(t) becomes the minimum. Here, "w" represents either the weight vector w1 or the weight vector w2.

$$\begin{aligned} e(t) &= d(t) - S1(t) \approx d(t) - y(t) \qquad \text{Formula 2} \\ &= d(t) - (w1(t)\times x1(t) + w2(t)\times x2(t)) \end{aligned}$$

The values w1(t+1) and w2(t+1) are obtained by correcting the values w1(t) and w2(t) respectively so that error e (t) between the extracted signal S1(t) and the reference signal d(t) becomes smaller. As time progresses, every weight vector value becomes closer to a certain value, and by the time the substantial data is received following the preamble and unique word, the extracted signal S1(t) becomes accurate. It should be noted here that a weight vector value obtained lastly for a preceding time slot may be used as an initial value of the weight vector for the succeeding time slot.

Now, the prediction of the reception response vector by the reception response vector predicting unit 524 will be described.

Figure 3:
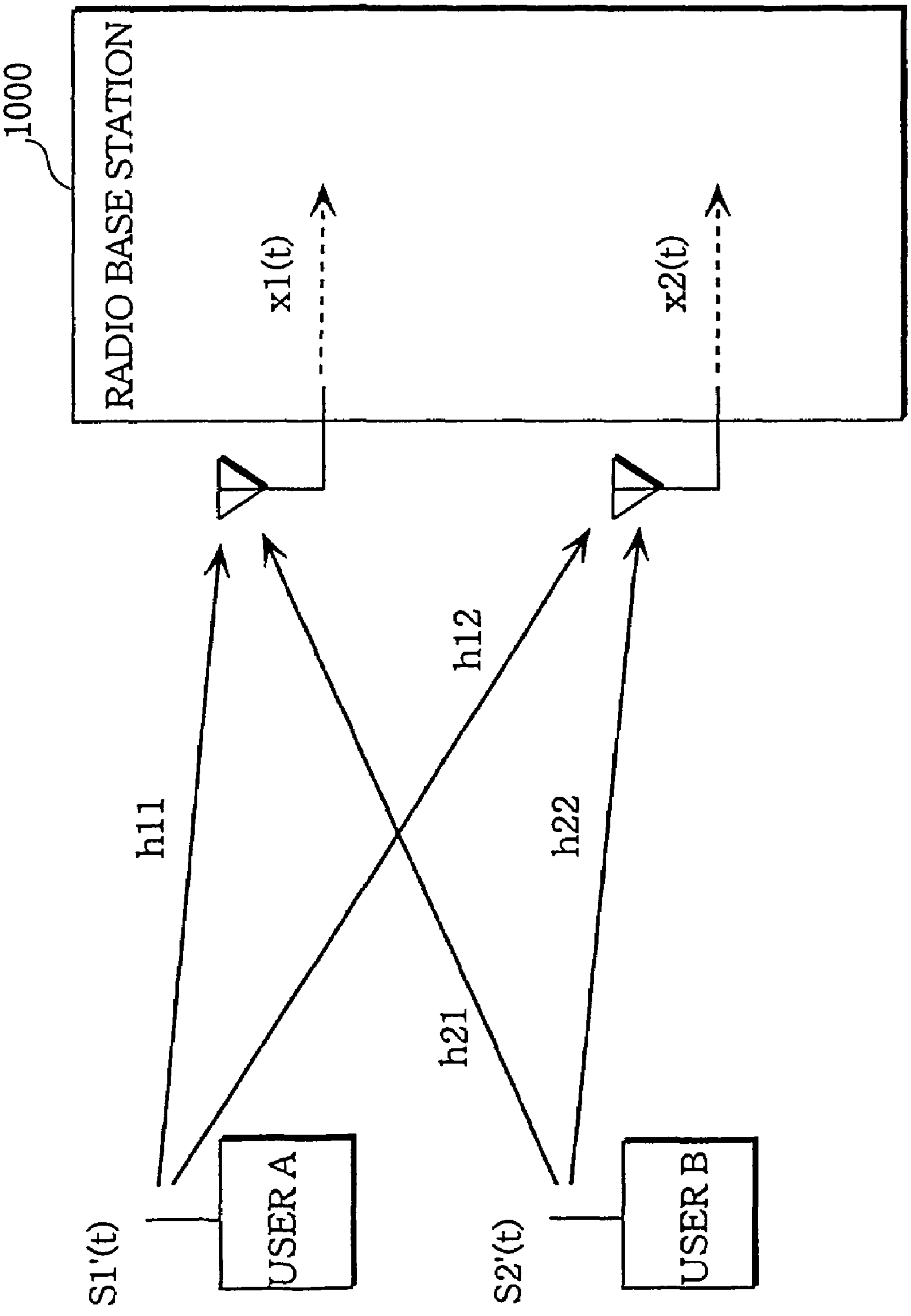
FIG. 3 shows how the radio base station receives signals transmitted from mobile stations of the users A and B.

FIG. 3 shows how the radio base station receives signals transmitted from mobile stations of the users A and B.

In FIG. 3, S1'(t) represents a signal transmitted from the user A (also referred to as "the first mobile station"), and S2'(t) represents a signal transmitted from the user B (also referred to as "the second mobile station"), x1(t) represents a signal received by the antenna 11 (also referred to as "the first antenna) and the radio unit 21 of the radio base station 1000, and x2(t) represents a signal received by the antenna 12 (also referred to as "the second antenna) and the radio unit 22.

Also, $h_{ij}$ is a complex number that indicates a signal propagation path from the $i^{th}$ mobile station to the $j^{th}$ antenna.

The relationships between S1'(t), S2'(t), x1(t), and x2(t) are represented by the following Formulas 3 and 4.

$$x1(t)=h_{1\,1}S1'(t)+h_{2\,1}S2'(t)+n_1(t) \qquad \text{Formula 3}$$

$$X2(t)=h_{1\,2}S1'(t)+h_{2\,2}S2'(t)+n_2(t) \qquad \text{Formula 4}$$

In the above formulas, $n_1$(t) and $n_2$(t) represent noises. It should be noted here that the signal S1(t) separated and extracted by the radio base station 1000 is equal to S1'(t) transmitted by the user A if the transmitted signal is normally received and properly separated and extracted.

The reception response vector predicting unit 524 of the radio base station 1000 calculates "$h_{1\,1}$" and "$h_{2\,1}$" that are components of the reception response vector, by applying the reception signals x1(t) and x2(t) and the complex conjugate S1*(t) of the extracted signal S1(t) to the following Formulas 5 and 6.

$$h_{1\,1}S=E[x1(t)S1^*(t)] \qquad \text{Formula 5}$$

$$h_{1\,2}S=E[x2(t)S1^*(t)] \qquad \text{Formula 6}$$

In the above formulas, E represents the ensemble average that is an average value for a certain period "t" being composed of a plurality of symbol periods represented as t=1, 2, . . . n. Here, when n is 100, "t" is composed of 100 symbol periods.

When the signals S1(t) and S2(t) are normally extracted and are equal to the transmitted signals S1'(t) and S2'(t) respectively, the following Formulas 7 and 8 are obtained from the Formulas 3 and 4 by replacing S1'(t) and S2'(t) with S1(t) and S2(t), multiplying S1*(t) to both sides of the Formulas, and obtaining the ensemble average.

$$E[x1(t)S1*(t)] = E[h_{11}S1(t)S1*(t)] + E[h_{21}S2(t)S1*(t)] + E[n_1(t)S1*(t)] \qquad \text{Formula 7}$$

$$E[x2(t)S1*(t)] = E[h_{12}S1(t)S1*(t)] + E[h_{22}S2(t)S1*(t)] + E[n_2(t)S1*(t)] \qquad \text{Formula 8}$$

In the above formulas, E[S1(t)S1*(t)]=1, and basically, there is no correlation between the signals S1'(t) and S2'(t) transmitted from the mobile stations, and there is no correlation between the signal S1'(t) and the noise components. Accordingly, E[S2(t)S1*(t)]=0, E[n1(t)S1*(t)]=0, and E[n2(t)S1*(t)]=0.

This indicates that the Formulas 5 and 6 can be obtained from the Formulas 7 and 8. Note also that the effects of the noise components have been removed in terms of the formulas.

The reception response vector predicting unit 524 of the user signal A processing unit 52 performs calculations using the Formulas 5 and 6 to obtain $h_{1\,1}$ and $h_{1\,2}$, calculates a reception response vector H1 being composed of $h_{1\,1}$ and $h_{1\,2}$, and sends the reception response vector H1 to the reception DD ratio calculating unit 51. The reception response vector predicting unit of the user signal B processing unit 53 performs the same calculations to obtain $h_{2\,1}$ and $h_{2\,2}$, calculates a reception response vector H2 being composed of $h_{2\,1}$ and $h_{2\,2}$, and sends the reception response vector H 2 to the reception DD ratio calculating unit 51.

The reception DD ratio calculating unit 51, based on the reception response vectors H1 and H2, calculates D1/D2 that is the reception DD ratio of the first mobile station to the second mobile station, using the following Formula 9.

$$D1/D2=|H1|^2/|H2|^2=(|H11|^2+|H12|^2/(|H21|^2+|H22|^2) \qquad \text{Formula 9}$$

The reception DD ratio calculating unit 51 sends the obtained reception DD ratio to the control unit 80.

The control unit 80 performs the control as necessary using the sent reception DD ratio.

Figure 4:
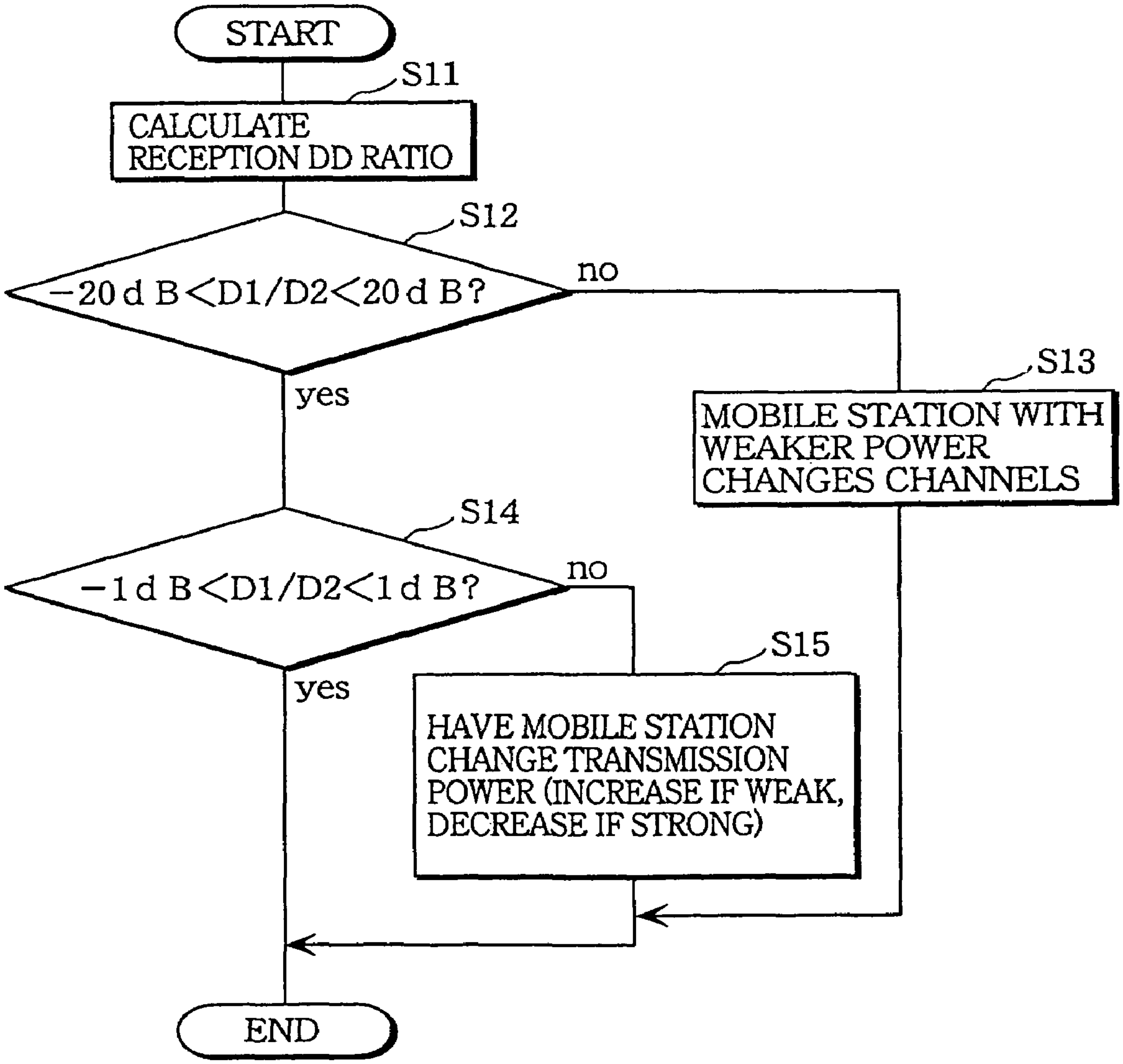
FIG. 4 is a flowchart showing the operation of the radio base station 1000 related to the reception DD ratio.

FIG. 4 is a flowchart showing the operation of the radio base station 1000 related to the reception DD ratio.

The operation shown in FIG. 4 is repeatedly performed with, for example, one TDMA frame as one cycle. The calculation of the reception response vector is performed at one slot receiving a signal from a mobile station.

The radio base station 1000 allows the signal processing unit 50 to calculate the reception DD ratio, namely D1/D2 (step S11). The control unit 80 judges whether the D1/D2 is in a range from −20 dB to 20 dB (step S12). Here, D1/D2 is represented by a value obtained by multiplying 10 to the common logarithm, namely in unit of decibel. In the present embodiment, the reception DD ratio is used as the decibel value when the reception DD ratio is compared with numerical values.

If D1/D2 is outside the range from −20 dB to 20 dB, the control unit 80 exercises a control so that a mobile station having a weaker power changes channels (step S13). More specifically, the control unit 80 assigns the first mobile station with a different channel from the current one if D1/D2 is smaller than −20 dB, and assigns the second mobile station with a different channel from the current one if D1/D2 is greater than 20 dB, in either case in accordance with the procedure defined in the PHS standard, and notifies the mobile station with this assignment, and controls it to communicate with the assigned channel.

If D1/D2 is not outside the range from −20 dB to 20 dB, the control unit 80 judges whether D1/D2 is outside a range from −1 dB to 1 dB (step S14).

If D1/D2 is outside the range from −1 dB to 1 dB, the control unit 80 exercises what is called a transmission power control to increase the transmission power of a mobile station with a weak power and decrease the transmission power of a mobile station with a strong power (step S15).

Note that when D1/D2 is in the range of −1 dB to 1 dB in step S14, the control unit 80 does not exercise a particular control to change the communication state. This is because in general, it is judged that the communication quality is good when the reception DD ratio is close to the 0 dB since the communication state is considered to be at the best when electric waves from all mobile stations are received with substantially the same power.

As described above, the radio base station 1000 calculates and uses the reception DD ratio as an index for measuring the communication quality, and controls the transmission power or the like based on the index. With this construction, if the reception DD ratio goes away from 0 dB due to the movement and shadowing of a mobile station, that is to say if the mobile station is hidden behind some object, it is possible to respond to it quickly by changing the transmission power control or the communication channels.

Embodiment 2

A radio base station as Embodiment 2 of the present invention will be described with reference to the attached drawings.

Construction

Figure 5:
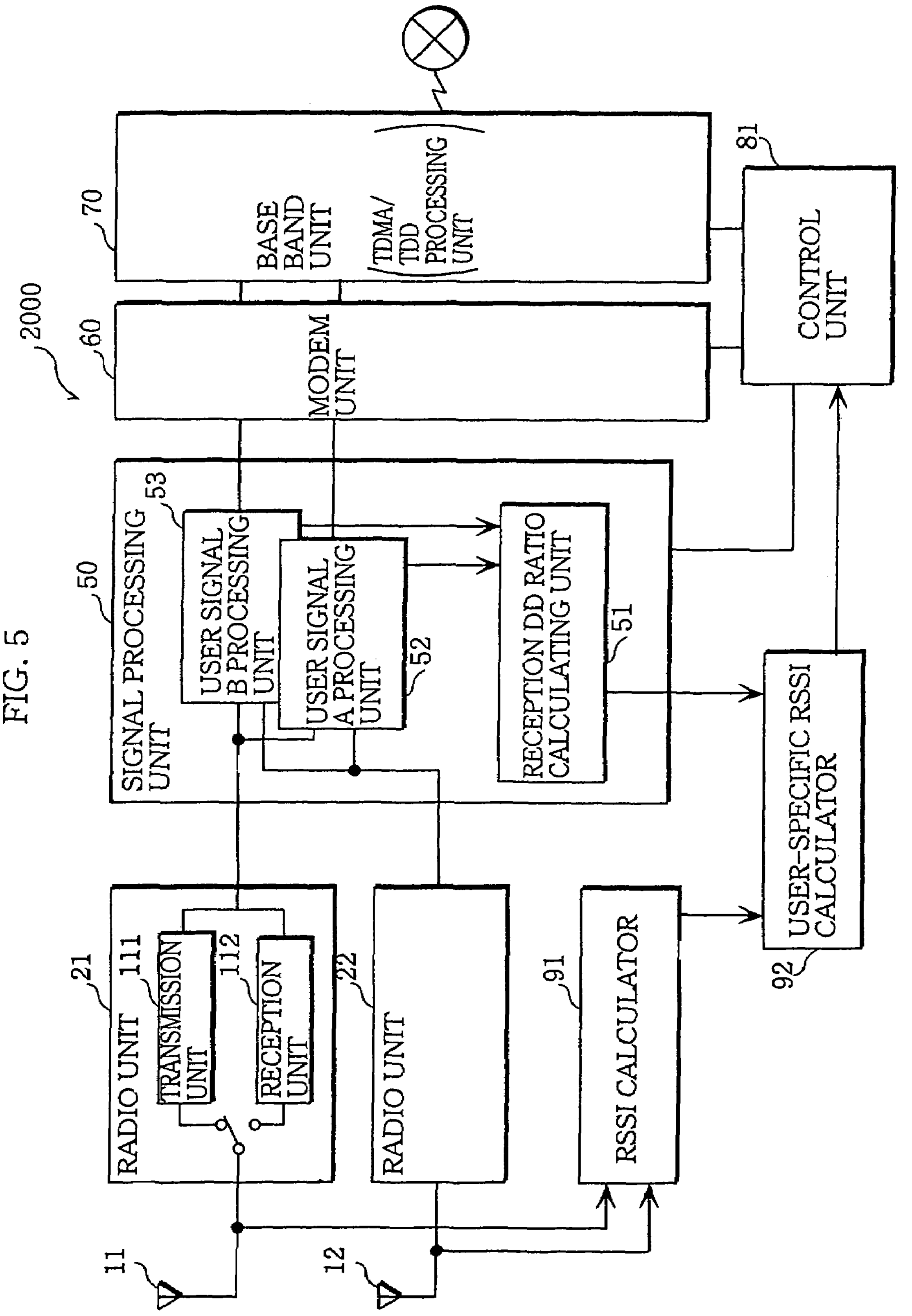
FIG. 5 is a block diagram showing the construction of the radio base station 2000 in Embodiment 2.

FIG. 5 is a block diagram showing the construction of the radio base station 2000 in Embodiment 2.

The radio base station 2000 has a function to calculate a reception power level RSSI (Receive Signal Strength Indication) for each mobile station and controls the transmission power or the like based on the calculated reception power level for each mobile station, as well as the functions of the radio base station 1000 described in Embodiment 1. Note that the RSSI numerically indicates the strength of the received electric wave signal.

As shown in FIG. 5, the radio base station 2000 includes antennas 11 and 12, radio units 21 and 22, a signal processing unit 50, a modem unit 60, a base band unit 70, a control unit 81, an RSSI calculator 91, and a user-specific RSSI calculator 92. Note that the components being the same as those of the radio base station 1000 in Embodiment 1 have the same reference numbers and will not be described in detail here.

The RSSI calculator 91 outputs the highest RSSI of the signals received by the antennas 11 and 12, and is the same as one contained in a general-purpose radio base station.

The user-specific RSSI calculator 92 calculates the reception power level for each mobile station and sends the calculated reception power levels to the control unit 81.

The control unit 81 has a function to control the transmission power or the like in accordance with the reception power level for each mobile station, as well as the functions of the control unit 80 described in Embodiment 1.

Operation

The operation of the radio base station 2000 with the above-stated construction will be described.

Figure 6:
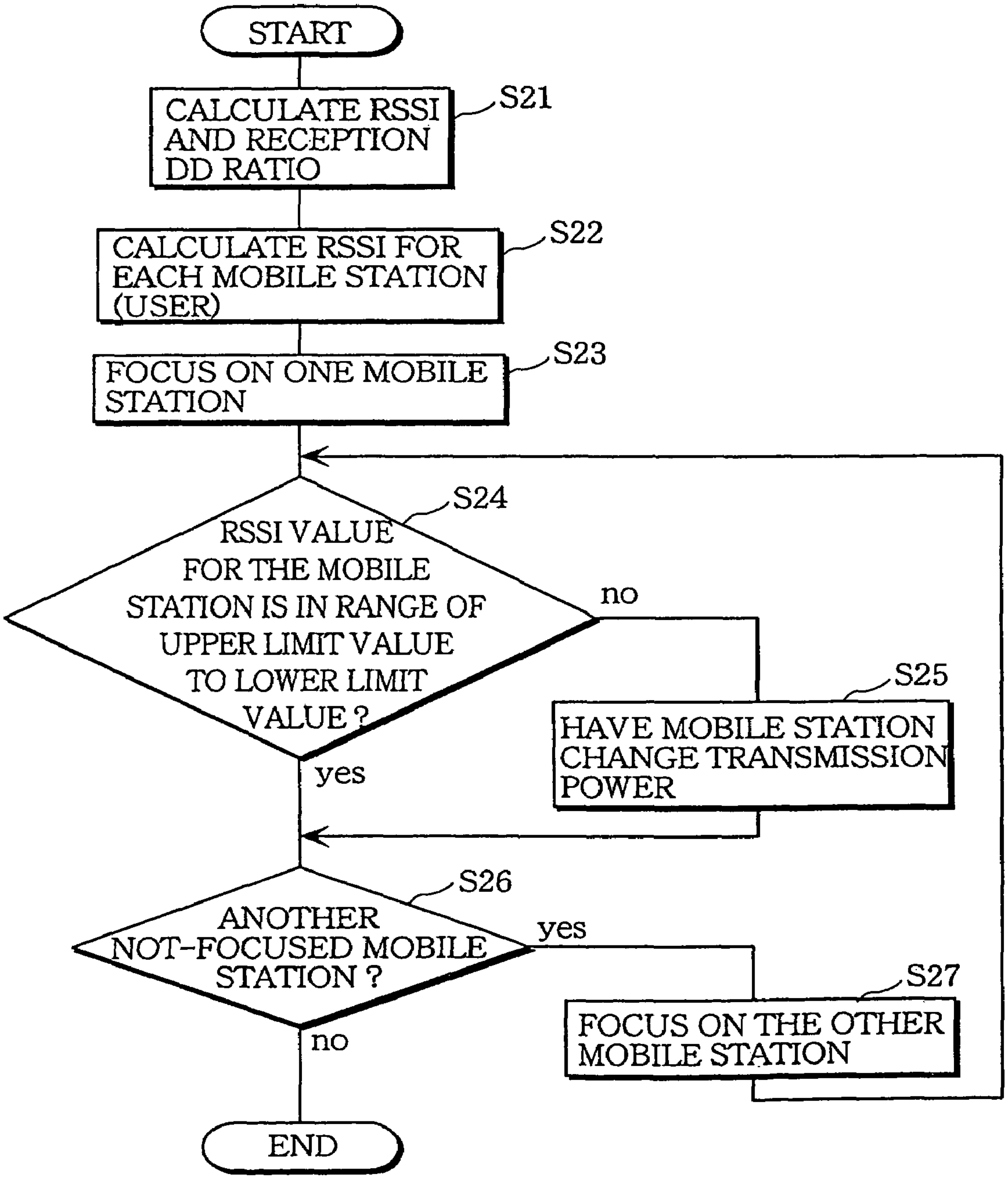
FIG. 6 is a flowchart showing the operation of the radio base station 2000 in relation to the calculation of the RSSI for each mobile station.

FIG. 6 is a flowchart showing the operation of the radio base station 2000 in relation to the calculation of the RSSI for each mobile station.

The operation shown in FIG. 6 is repeatedly performed with, for example, one TDMA frame as one cycle. The calculation of the reception response vector is performed at one slot receiving a signal from a mobile station.

The radio base station 2000 allows the RSSI calculator 91 to obtain RSSI values based on the signals received by the antennas 11 and 12, and allows the signal processing unit 50 to calculate the reception DD ratio following the procedure described in Embodiment 1 (step S21). The RSSI calculator 91 obtains RSSI values using the following Formula 10 by substituting the values of the reception signals x1(t) and x2(t) to x(t) in the formula, and outputs the highest of the calculated RSSI values. It should be noted here that the RSSI values are indicated in units of decibel and are represented by "RXPOWER" in general.

$$\begin{aligned} RSSI_{dB} &= 10\log(RXPOWER) + \alpha \\ &= 10\log(E[x(t)x^*(t)]) \quad [\mathrm{dB}] \end{aligned} \qquad \text{Formula 10}$$

In the above formula, x*(t) represents the complex conjugate of x(t), E represents the ensemble average that is an average value for a certain period "t" being composed of a plurality of symbol periods represented as t =1, 2, . . . n.

The user-specific RSSI calculator 92 obtains the RSSI value output from the RSSI calculator 91, the reception DD ratio output from the signal processing unit 50, and the reception DD ratio output from the reception DD ratio calculating unit 51, and calculate an RSSI for each mobile station using these obtained values (step S22). Here, an RSSI for the first mobile station is referred to as $RSSI_1$, and an RSSI for the second mobile station as $RSSI_2$. The user-specific RSSI calculator 92 calculates $RSSI_1$ and $RSSI_2$ using Formulas 11 and 12 shown below. Note that in the formulas, "D1/D2" represents a reception DD ratio of the first mobile station to the second mobile station.

$$\begin{aligned} RSSI_1 &= 10\log[RXPOWER \times \{D1/(D1+D2)\}] \\ &= RSSI_{dB} + 10\log\{D1/(D1+D2)\} \quad [\mathrm{dB}] \end{aligned} \qquad \text{Formula 11}$$

$$RSSI_2 = RSSI_{dB} + 10\log\{D2/(D1+D2)\} \quad [\mathrm{dB}] \qquad \text{Formula 12}$$

The value D1/(D1+D2) in Formula 11 and the value D2/(D1+D2) in Formula 12 is represented as N1/(N1+1) and 1/(N1+1) respectively when D1/D2 is replaced by N1.

The user-specific RSSI calculator 92 sends the RSSI values calculated for each mobile station to the control unit 81. Upon receiving the RSSI values, the control unit 81 focuses on a mobile station (step S23), and judges whether an RSSI value for the mobile station is in a range of an upper limit value to a lower limit value (step S24). The control unit 81 holds the upper and lower limit values in a memory beforehand, where the lower limit value is the lowest value with which the radio base station can receive and extract a signal from a mobile station while maintaining the signal quality, and the upper limit value is the highest value that keeps a signal from a mobile station at a proper strength, that is to say, if an RSSI value exceeds the upper limit value, the RSSI value is too strong.

When it is judged that the RSSI value for the focused mobile station is out of the range of the upper limit value to the lower limit value, a control is exercised so that the mobile station changes the transmission power (step S25). More specifically, if the RSSI value is lower than the lower limit value, the mobile station is instructed to increase the transmission power; and if the RSSI value is higher than the upper limit value, the mobile station is instructed to decrease the transmission power.

When it is judged that the RSSI value for the focused mobile station is in the range of the upper limit value to the lower limit value, the process of step S25 is skipped.

After completing the processes for steps S24 and S25 focusing on one mobile station, the control unit 81 judges whether there is a mobile station not yet focused (step S26). If the judgment result is positive, the control unit 81 focuses on a not-yet-focused mobile station (step S27), and performs the processes of steps S24 and S25. After every mobile station has been focused, the operation shown in FIG. 6 ends.

Supplemental Remarks

The radio base station of the present invention has been described through Embodiments 1 and 2. The present invention, however, is not limited to these embodiments. That is to say, the present invention can be varied as follows, for example.

(1) In the above Embodiments, radio base stations and mobile stations operate in the PHS system. However, not limited to the PHS system, the present invention can be adapted to any space division multiplex communication systems in which the above-described reception DD ratio or user-specific RSSI can be calculated and used as an index of the communication quality and as a judgment criterion in controlling, for example, the transmission power.

(2) The reception DD ratio or RSSI value for each mobile station described in the above Embodiments can be used as a judgment criterion for various judgments in determining whether to exercise a control. Accordingly, these values can be used for various controls, for example, as a judgment criterion in determining whether to issue a hand-over command to a mobile station with a weak power to be handed over to another radio base station, as well as in judging whether to exercise a control depending on the reception DD ratio, as described in Embodiment 1 (steps s12-S15) and in judging whether to exercise a control depending on an RSSI value for each mobile station, as described in Embodiment 2 (steps s24-S25).

It is also possible to judge whether to execute the transmission power control by referring both the reception DD ratio and the RSSI value for each mobile station. This is performed in the following procedure, for example. If the reception DD ratio of the first mobile station to the second mobile station, namely D1/D2 is outside the range of −1 dB to 1 dB, it is judged whether the RSSI value for each mobile station belongs to a range between an upper limit value and a lower limit value. Then, if a lower RSSI value out of the two RSSI values is lower than the upper limit value, a mobile station with the lower RSSI value is instructed to increase the transmission power; and if a higher RSSI value out of the two RSSI values is higher than the lower limit value, a mobile station with the higher RSSI value is instructed to decrease the transmission power.

(3) The operation procedure shown in FIG. 4 or 6 is executed once for every TDMA frame. However, the procedure is not necessarily executed for all frames. For example, an average of reception DD ratio values for several frames may be calculated first, then it may be judged based on the obtained average value whether to exercise a control such as the transmission power control, or the control may be exercised based on the obtained average value. It should be noted here that a change of propagation paths can be handled quickly when the reception DD ratio is obtained every short time period such as every TDMA frame or every reception time slot in time division multiplexing.

(4) In the method for predicting a signal propagation path, or the method for calculating the reception response vector shown in Embodiment 1, another propagation path prediction algorithm may be used in so far as it can be used to calculate a reception response vector eliminating noise components as well as the algorithm used in Embodiment 1.

(5) Embodiment 1 shows, as an example, two mobile stations are multiplexed by the space division multiplex using two antennas. Even in the case where three or more mobile stations are multiplexed using three or more antennas, it is possible to obtain the reception DD ratio or RSSI value for each mobile station on the same principle and perform a control based on the obtained values.

For example, when three mobile stations are multiplexed using three antennas, first h11-h13, h21-h23, and h31-h33 are obtained in the same manner as h11-h12 and h21-h22 are obtained in Embodiment 1, secondly reception response vector H1 containing h11, h12, and h13 as its components, reception response vector H2 containing h21, h22, and h23 as its components, and reception response vector H3 containing h31, h32, and h33 as its components are obtained, and finally D1/D2 and D1/D3 are obtained using Formulas 13 and 14 shown below so that the obtained values can be used to judge whether to exercise a control such as the transmission power control.

$$D1/D2=|H1|^2/|H2|^2=(|H11|^2+|H12|^2+|H13|^2/(|H21|^2+|H22|^2+|H23|^2) \quad \text{Formula 13}$$

$$D1/D3=|H1|^2/|H3|^2=(|H11|^2+|H12|^2+|H13|^2/(|H31|^2+|H32|^2+|H33|^2) \quad \text{Formula 14}$$

The values obtained in this way can be used in judgements or controls. For example, if D1/D2 does not satisfy the condition "−20dB<D1/D2<20dB", or if D1/D3 does not satisfy the condition "−20dB<D1/D3<20dB", a mobile station with a weak power may be Instructed to change channels, as in step S13.

(6) In Embodiment 2, the RSSI calculator 91 outputs the highest reception power level (RSSI) of the signals received by the antennas 11 and 12. However, the RSSI calculator 91 may output an average of reception power levels of signals received via the antennas.

INDUSTRIAL APPLICABILITY

The radio communication quality measuring apparatus and method of the present invention can used to measure the communication quality at radio base stations.

The invention claimed is:

1. A radio communication quality measuring apparatus for use in a radio base station that communicates with a plurality of mobile stations by a method of simultaneously multiplexing into the same frequency, characterized by measuring a reception response vector that indicates a propagation path of a signal from a mobile station to the radio base station, for each of the plurality of mobile stations, calculating a reception power ratio from reception response vectors in terms of two mobile stations out of the plurality of mobile stations, and outputting the reception power ratio as an index of communication quality.

2. A radio base station that communicates with a plurality of mobile stations by space division multiplex, comprising:

a plurality of antennas;

a reception response vector calculating means for calculating a reception response vector that indicates a propagation path of a signal from a mobile station to the plurality of antennas, for each of the plurality of mobile stations;

a reception power ratio calculating means for calculating a reception power ratio of two mobile stations, the reception power ratio being a ratio of (i) a square of a reception response vector, calculated by the reception response vector calculating means, of one of the two mobile stations to (ii) a square of a reception response vector, calculated by the reception response vector calculating means, of the other of the two mobile stations; and a control means for, if the calculated reception power ratio is outside a predetermined value range, exercising a control to change a state of communication that is performed with at least one of the plurality of mobile stations.

3. The radio base station of claim 2, wherein the radio base station performs a radio communication by a time division multiplex in addition to the space division multiplex, the reception response vector calculating means calculates the reception response vector for each reception time slot for the time division multiplex, and the reception power ratio calculating means calculates the reception power ratio for each reception time slot for the time division multiplex.

4. A radio base station that communicates with a plurality of mobile stations by space division multiplex, comprising:

a plurality of antennas;

a reception response vector calculating means for calculating a reception response vector that indicates a propagation path of a signal from a mobile station to the plurality of antennas, for each of the plurality of mobile stations;

a reception power ratio calculating means for calculating a reception power ratio of two mobile stations, the reception power ratio being a ratio of (i) a square of a reception response vector, calculated by the reception response vector calculating means, of one of the two mobile stations to (ii) a square of a reception response vector, calculated by the reception response vector calculating means, of the other of the two mobile stations;

a reception power level measuring means for measuring a reception power level for each signal received via the plurality of antennas;

a mobile-station-specific reception power level calculating means for calculating a reception power level for each of the plurality of mobile stations according to the calculated reception power ratio and the measured reception power level; and a control judging means for judging whether to exercise a control to change a state of communication performed with each of the plurality of mobile stations, according to the calculated reception power level for each mobile station.

5. A radio communication quality measuring method that is used in a radio base station that communicates with a plurality of mobile stations by space division multiplex, and is used to calculate a reception power ratio that is an index used as a criterion in judging whether to exercise a control to change a state of communication performed with each of the plurality of mobile stations, the radio communication quality measuring method comprising:

a reception response vector calculating step for calculating a reception response vector that indicates a propagation path of a signal from a mobile station to the plurality of antennas, for each of the plurality of mobile stations; and a reception power ratio calculating step for calculating a reception power ratio of two mobile stations, the reception power ratio being a ratio of (i) a square of a reception response vector, calculated in the reception response vector calculating step, of one of the two mobile stations to (ii) a square of a reception response vector, calculated in the reception response vector calculating step, of the other of the two mobile stations.

6. A radio communication quality measuring apparatus for use in a radio base station that communicates with a plurality of mobile stations by a method of simultaneously multiplexing into the same frequency, characterized by measuring a reception response vector that indicates a propagation path of a signal from a mobile station to the radio base station, for each of the plurality of mobile stations, calculating a reception power ratio from reception response vectors in terms of two or more mobile stations out of the plurality of mobile stations, and outputting the reception power ratio as an index of communication quality.

7. The radio base station of claim 1, wherein the reception power ratio is calculated using an extracted signal.

8. The radio base station of claim 7, wherein the extracted signal is equivalent to a signal from a mobile station to the radio base station, for each of the plurality of mobile stations.

9. The radio base station of claim 8, wherein the extracted signal is calculated by correcting weight values to minimize an error between a reference signal and the extracted signal, 10. The radio base station of claim 2 wherein, when the calculated reception power ratio is outside a range from −20 dB to 20 dB, the control means exercises a control to change a state of communication that is performed with at least one of the plurality of mobile stations.

11. The radio base station of claim 10 wherein, the reception power ratio calculating means calculates a reception power ratio of two mobile stations, the reception power ratio being a ratio of (i) a square of a reception response vector, calculated by the reception response vector calculating means, of a first mobile station to (ii) a square of a reception response vector, calculated by the reception response vector calculating means, of a second mobile station, and when the calculated reception power ratio is smaller than −20 dB, the control means assigns the first mobile station to a different channel.

12. The radio base station of claim 11 wherein, when the calculated reception power ratio is greater than 20 dB, the control means assigns the second mobile station to a different channel.

13. The radio base station of claim 12 wherein, when the calculated reception power ratio is between a range from −20 dB to −1 dB, the control means exercises a control to increase a transmission power of the first mobile station and to decrease a transmission power of the second mobile station.

14. The radio base station of claim 13 wherein, when the calculated reception power ratio is between a range from 1 dB to 20 dB, the control means exercises a control to increase the transmission power of the second mobile station and to decrease the transmission power of the first mobile station.

15. The radio base station of claim 4 wherein, when the calculated reception power level for a first mobile station is lower than a first predetermined value, the control judging means exercises a control to increase a transmission power of the first mobile station.

16. The radio base station of claim 15 wherein, when the calculated reception power level for the first mobile station is higher than a second predetermined value, the control judging means exercises a control to decrease the transmission power of the first mobile station.

* * * * *